(12) United States Patent
Senuma

(10) Patent No.: US 7,000,040 B2
(45) Date of Patent: Feb. 14, 2006

(54) APPARATUS AND METHOD FOR RECEIVING AND DEMODULATING DATA MODULATED IN PSEUOD-TERNARY FORM

(75) Inventor: Koichi Senuma, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 951 days.

(21) Appl. No.: 10/026,556

(22) Filed: Dec. 27, 2001

(65) Prior Publication Data

US 2003/0123398 A1 Jul. 3, 2003

(30) Foreign Application Priority Data

Dec. 27, 2000 (JP) .............................. 2000-398097

(51) Int. Cl.
*G06F 13/00* (2006.01)

(52) U.S. Cl. ...................................... 710/100; 375/257

(58) Field of Classification Search ................ 370/210, 370/284; 710/3, 313, 310, 306, 305, 106, 710/105, 304, 303, 302, 301, 300, 100; 375/316, 375/340, 288, 286, 258, 257

See application file for complete search history.

(56) References Cited

U.S. PATENT DOCUMENTS 6,598,102 B1 * 7/2003 Ninomiya et al. .......... 710/100

FOREIGN PATENT DOCUMENTS

| JP | 60-227549 | 11/1985 |
| JP | 4-126428 | 11/1992 |
| JP | 2001-014269 | 1/2001 |
| JP | 2001-016278 | 1/2001 |

OTHER PUBLICATIONS

Ninomiya, Ryoji et al., "Serial Signal Transmission Apparatus", U.S. Appl. No. 09/605,992 filed Jun. 29, 2000.
Nakamura, Nobutaka "Basic Concept of PCI Serial Transmission", U.S. Appl. No. 09/605,399 filed Jun. 28, 2000.

* cited by examiner

*Primary Examiner*—Brenda Pham
(74) *Attorney, Agent, or Firm*—Finnegan, Henderson, Farabow, Garrett & Dunner, L.L.P.

(57) ABSTRACT

A first comparator makes a comparison between potentials on paired signal lines connected with the secondary winding of a transformer to produce a signal indicating whether data of a first value has been received or not. A second comparator makes a comparison between potentials on the paired signal lines to output a signal indicating whether data of a second value has been received or not. A first detector samples the output signal of the first comparator at regular sampling intervals to produce a signal indicating whether an output signal indicating the reception of data of the first value has been produced from the first comparator. A second detector samples the output signal of the second comparator at the regular sampling intervals to produce a signal indicating whether an output signal indicating the reception of data of the second value has been produced from the second comparator.

11 Claims, 6 Drawing Sheets

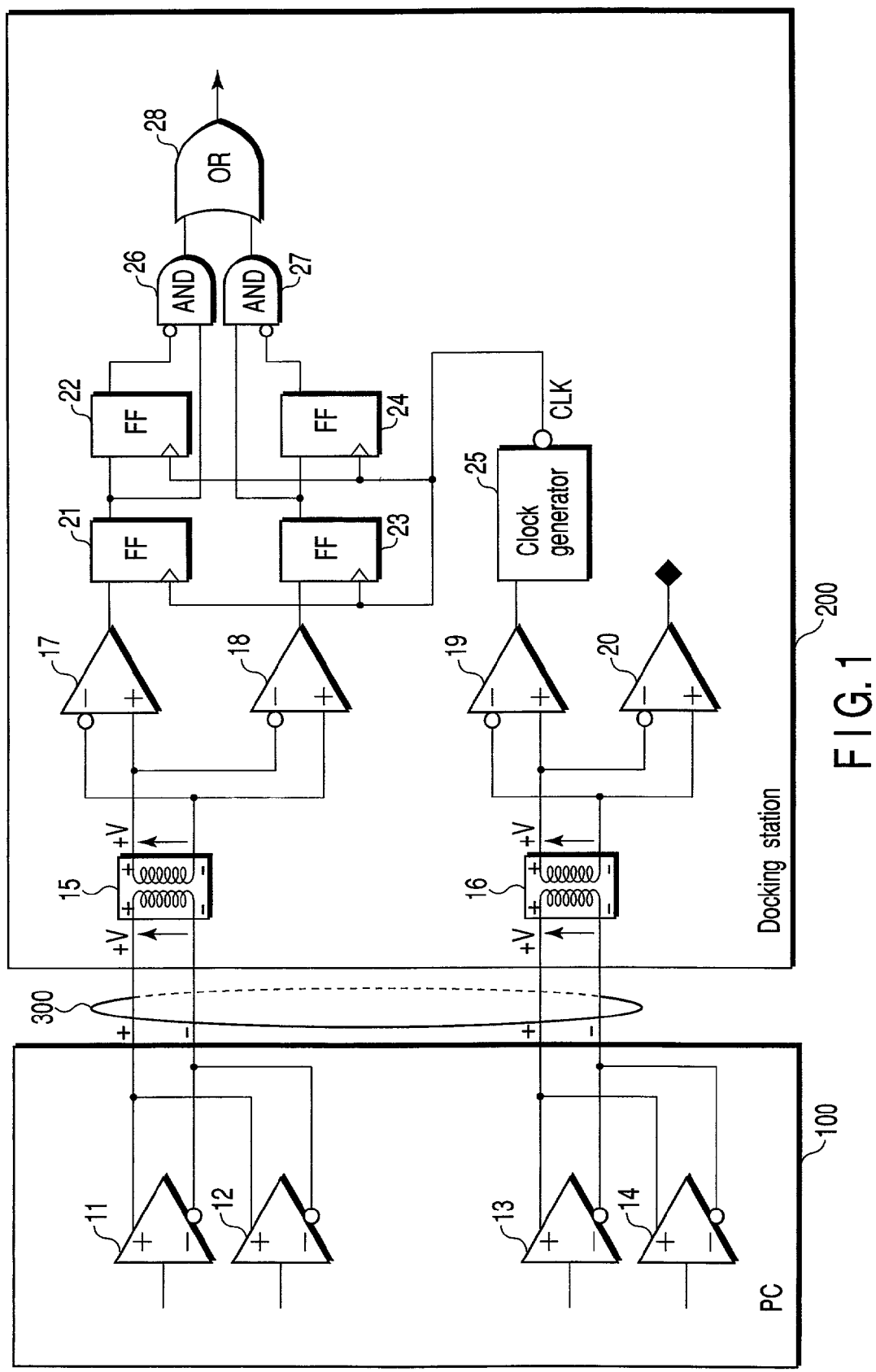
F I G. 1

APPARATUS AND METHOD FOR RECEIVING AND DEMODULATING DATA MODULATED IN PSEUOD-TERNARY FORM

CROSS-REFERENCE TO RELATED APPLICATIONS

This application is based on and claims the benefit of priority from the prior Japanese Patent Application No. 2000-398097, filed Dec. 27, 2000, the entire contents of which are incorporated herein by reference.

BACKGROUND OF THE INVENTION

1. Field of the Invention

The present invention relates to a apparatus and method for receiving and demodulating data modulated in a pseudo-ternary form, and more specifically to a device and method for receiving and recovering data modulated in a pseudo-ternary form and transferred over a pair of signal lines in which a transformer is inserted.

2. Description of the Related Art

In recent years, various portable computers have been developed. Some of the portable computers are designed so that they can be attached to an expansion unit in order to increase their functions. The bus of a portable computer is connected with the bus of an expansion unit. This bus connection allows devices on the bus within the expansion unit to be handled in the same way as those within the portable computer.

Many computers use a PCI (Peripheral Component Interconnect) bus. The bus connection between the computer and the expansion unit is implemented by physically connecting the PCI buses of the computer and the expansion unit together through docking connectors that are installed in the computer and the expansion unit. Each docking connector has as many pins as there are signal lines in the PCI bus.

According to such a configuration, however, both the computer and the expansion unit need a large amount of space to house the docking connector. This involves difficulties when a computer is to be downsized. In addition, the position in the computer where the docking connector is mounted needs to coincide with that of the docking connector of the expansion unit, which imposes restrictions on the physical structure of the casing of the computer in developing products.

From such a background, the demand has increased for developing a technique to connect two buses through a high-speed serial interface. The use of the high-speed serial interface allows the computer and the expansion unit to be connected together through a thin, flexible serial cable. Expected serial data transfer methods suitable for implementation of the high-speed serial interface include a method of utilizing a difference signal, and one of utilizing a bipolar signal.

The former carries out serial data transfer through the use of paired signals which are reversed in phase with respect to each other. Binary data at logic level 1 or 0 is transmitted in the form of paired signals which are reversed in phase with respect to each other. The latter makes transfer of serial data through the use of three voltage levels: +V, 0, and −V. Binary data at logic level 1 or 0 is transferred in the form of either +V, 0, or −V.

In order to implement a high-speed serial data transfer, some provision must be made for increasing noise immunity. The immunity of signals to be transferred to noise can be improved by inserting a transformer in a serial transmission line. Since the insertion of a transformer allows DC components of transmitted signals to be cut, the immunity to extraneous common mode noise, such as static electricity, can be improved. However, for signal transmissions over a transformer, attention must be paid to the following two points:

1) In order to prevent magnetic saturation of the transformer, it is required to prevent current from continuing to flow in one direction.

2) The total time during which a voltage is applied in the positive direction to the transformer and the total time during which voltage is applied in the negative direction to the transformer should be made substantially equal to each other. In the event that the time during which voltage is applied in one direction to the transformer is longer, there arises a problem that the voltage waveform of a signal produced on the secondary side of the transformer shifts in the positive or negative direction.

To meet the two requirements, it is best to modulate data in a pseudo-ternary form for transmission. In the pseudo-ternary signal transmission, which is one of the bipolar-signal-based methods, data modulated in a pseudo-ternary form is transferred over a transmission line in which a transformer is inserted. The pseudo-ternary transmission uses three values: a positive value (positive pulse), a negative value (negative pulse), and zero (no pulse). Each binary data to be transmitted is converted into one of three states of a positive pulse, a negative pulse and no pulse. The positive pulse state is the state in which current flows in the positive direction in the transformer. The negative pulse state is the state in which current flows in the negative direction in the transformer. The no pulse state is the state where no current flows in the transformer.

When such a pseudo-ternary signal transmission technique is used, the possible upper limit of the data transmission rate depends on the performance of the receiving device for reception and demodulation of the data. As the data transmission rate increases, it becomes more difficult to receive and demodulate correctly the three values of +V, −V and ±0 (corresponding to a positive pulse, a negative pulse, and no pulse, respectively) that will appear on the secondary side of the transformer. In other words, it is easy for errors to occur in data demodulation.

BRIEF SUMMARY OF THE INVENTION

It is an object of the present invention to provide a apparatus and method which allows data modulated in a pseudo-ternary form to be received and demodulated with precision.

According to one aspect of the present invention, there is provided a data receiving apparatus for receiving and demodulating data modulated in a pseudo-ternary form which is transferred over a signal line pair in which a transformer is inserted, the data modulated in pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising: a first comparator configured to make a comparison between potentials on the paired signal lines connected with the secondary winding of the transformer to produce a signal indicating whether data of the first value has been received or not; a second comparator configured to make a comparison between potentials on the paired signal lines connected with the secondary winding of the transformer to output a signal indicating whether data of the second value has been received or not; a first detector configured to sample the output signal of the first comparator at regular sampling intervals and to compare the value of the current sample with the value of a sample of one sampling interval before to produce a signal indicating whether an output signal indicating the reception of data of the first value has been produced from the first comparator; a second detector configured to sample the output signal of the second comparator at the regular sampling intervals and to compare the value of the current sample with the value of a sample of one sampling interval before to produce a signal indicating whether an output signal indicating the reception of data of the second value has been produced from the second comparator; and an output circuit connected to receive the output signals of the first and second detectors, configured to produce demodulated data corresponding to the data modulated in the pseudo-ternary form.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 1 is a block diagram of a serial signal transmission system using a data receiving device according to an embodiment of the present invention;

DETAILED DESCRIPTION OF THE INVENTION

Figure 2:
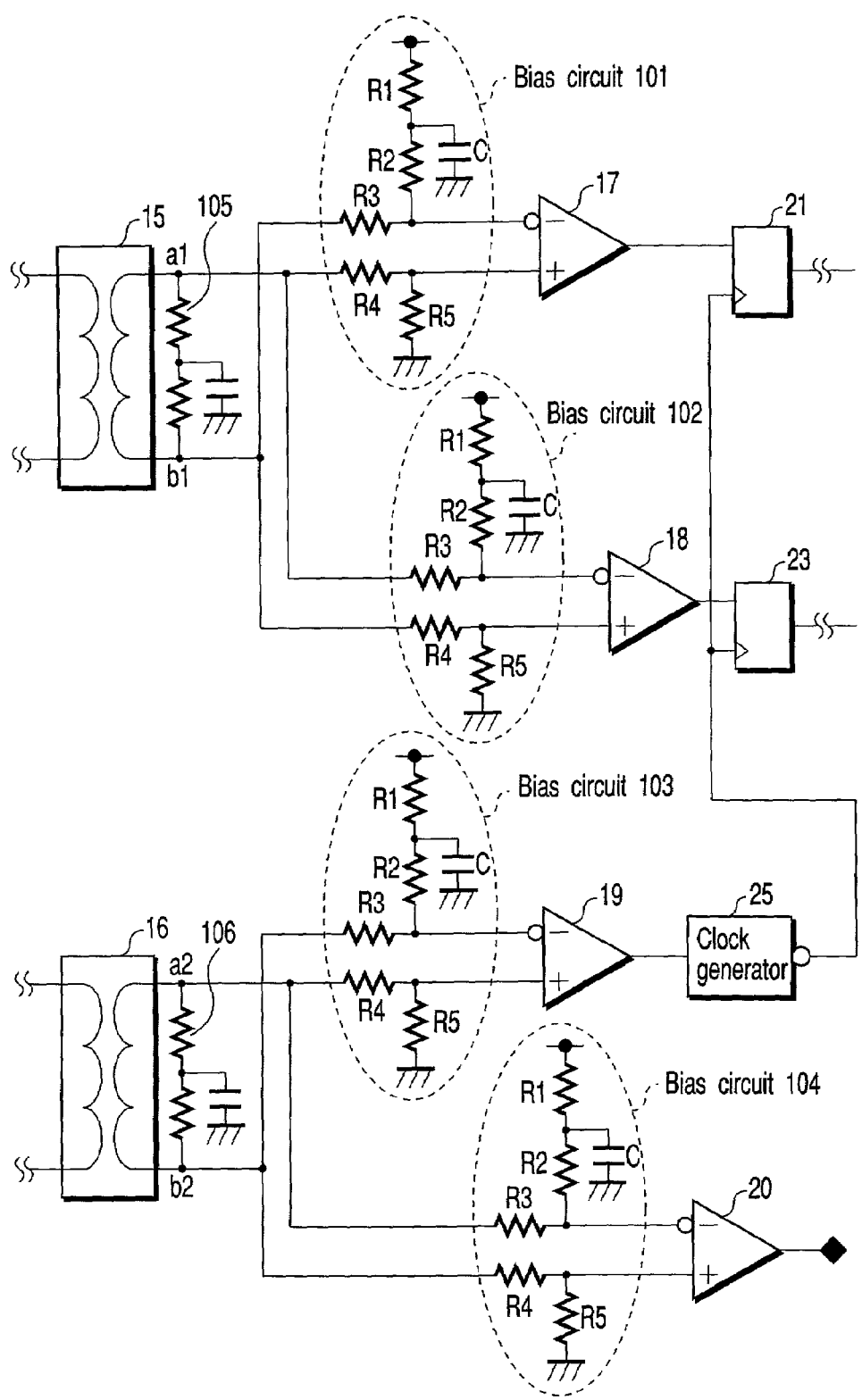
FIG. 2 shows the arrangement of peripheral circuits of the voltage comparators shown in FIG. 1.

Referring now to FIG. 1, there is illustrated a configuration of a serial data transmission system using a data receiving device according to an embodiment of the present invention. This system transmits data in a time sequence over a differential signal line pair in which a transformer is inserted. Hereinafter, the serial data transmission system will be described by way of an example in which a personal computer 100 and an extension unit 200 are connected together by a serial transmission line 300 consisting of a cable.

The serial transmission line 300 includes a differential signal line pair for data transmission and a differential signal line pair for clock transmission. A transformer (pulse transformer) 15 is inserted in the differential signal line pair for data transmission. Also, a transformer (pulse transformer) 16 is inserted in the differential signal line pair for clock transmission. Since the serial transmission line 300 consists of a cable, in practice, the transformers 15 and 16 are installed, as shown, in a device at the receiving end (in FIG. 1, the docking station 200).

Serial Data Transmitter

A device at the transmitting end (in FIG. 1, the personal computer 100) is equipped, as shown, with a pair of differential output buffers 11 and 12 for data transmission and a pair of differential output buffers 13 and 14 for clock transmission.

Each of the differential output buffers 11 and 12 drives the differential signal line pair for data transmission connected to the primary winding of the transformer 15 by its own constant current output. The output of each of the buffers 11 and 12 takes one of two different states of "1" and "0". In the "1" output state, the positive and negative output terminals of each of the buffers 11 and 12 are set at positive and negative potentials, respectively. As a result, a current flows in the differential line pair and the transformer 15 in the direction from the positive output terminal (+) to the negative output terminal (−) of each of the buffers. In the "0" output state, on the other hand, the positive and negative output terminals of each of the buffers 11 and 12 are set at negative and positive potentials, respectively. As a result, a current flows in the differential line pair and the transformer 15 in the direction from the negative output terminal (−) to the positive output terminal (+) of each buffer.

The differential output buffers 11 and 12 are connected in parallel with the differential signal line pair connected to the primary winding of the transformer 15 and have their positive output terminals connected together to one of the two signal lines in the differential signal line pair and their negative output terminals connected together to the other.

The differential output buffers 11 and 12 can drive the differential signal line pair in three values of +V, −V and ±0 in accordance with combinations of their output states. The +V value corresponds to the state where current flows in the positive direction in the transformer 15. The −V value corresponds to the state where current flows in the negative direction in the transformer 15. The ±0 value corresponds to the state where no current flows in the transformer 15.

In the transmission of +V over the differential signal line pair, both the buffers 11 and 12 are in the "1" output state. In the transmission of −V, both the buffers 11 and 12 are in the "0" output state. In the transmission of ±0, one of the buffers 11 and 12 is in the "1" output state and the other is in the "0" output state.

The use of those output buffers 11 and 12 allows binary bits of 0 and 1 values to be transmitted with conversion (modulation) into pseudo-ternary data that takes a value of either +V, −V, or ±0. In the modulation into pseudo-ternary data, a bit of a "1" is converted into +V or −V. In this case, successive bits each of a "1" are alternately converted into +V and −V in such a way that a "1" to be transmitted first is converted into +V, a "1" to be transmitted next is converted into −V, and a "1" to be transmitted next is converted into +V. A bit of a "0" is always converted into ±0.

Thus, in the serial transmission of bits of "1, 1, 0, 0, 1, 0, 1, 0, 0", the bits are modulated in the form of "+V, −V, ±0, ±0, +V, ±0, −V, ±0, ±0".

The operation of the buffers 11 and 12 is controlled as follows:

(1) Transmission of ±0

The buffer 11 outputs a "1", whereas the buffer 12 outputs a "0". In this case, a current output from the positive output terminal (+) of the buffer 11 flows into the positive output terminal (+) of the buffer 12. A current output from the negative output terminal (−) of the buffer 12 flows into the negative output terminal (−) of the buffer 11. Therefore, no current flows in the transformer 15, with the result that no voltage is applied across the primary winding of the transformer and no voltage is induced across the secondary winding as well (no pulse). Thus, the state in which the output currents of the buffers 11 and 12 cancel out corresponds to the ±0 output state. The input data to the buffers 11 and 12 are a "1" and a "0", respectively.

(2) Transmission of +V

The buffers 11 and 12 both output "1"s. At this point, the differential signal line pair is driven by the sum of output currents output from the positive output terminals (+) of the respective buffers. Thus, a current flows in the positive direction in the transformer 15, so that the voltage +V is impressed across its primary winding. Since the turn ratio of the transformer 15 is one to one, the voltage induced across the secondary winding is +V (the positive terminal of the secondary winding is positive in potential with respect to the negative terminal), i.e., a positive pulse of the magnitude V is produced. The input data to the buffers 11 and 12 are both "1"s.

(2) Transmission of −V

The buffers 11 and 12 both output "0"s. At this point, the differential signal line pair is driven by the sum of output currents from the negative output terminals (−) of the respective buffers. Thus, a current flows in the negative direction in the transformer 15, so that the voltage −V is impressed across its primary winding. Since the turn ratio of the transformer 15 is one to one as described before, the voltage induced across the secondary winding is −V (the positive terminal of the secondary winding is negative in potential with respect to the negative terminal), i.e., a negative pulse of the magnitude V is produced. The input data to the buffers 11 and 12 are both "0"s.

The two differential output buffers 13 and 14 for clock transmission have the same function as the data transmission buffers 11 and 12. The different point is that they convert data indicating the timing of transfer of pseudo-ternary serial data into pseudo-ternary form (as opposed to converting binary serial data into pseudo-ternary form). Specifically, the repeating pattern of binary serial data, necessary to generate sampling clock in the receiving end, is modulated in the pseudo-ternary form. The unit of repetition of binary serial data is, for example, "1, 1, 0, 0, 0, 0, 0, 0, 0", which is converted into clock data of a pseudo-ternary form of "+V, −V, ±0, ±0, ±0, ±0, ±0, ±0, ±0". The receiving device detects the timing of the appearance of a +V or −V in the pseudo-ternary clock data repeating pattern "+V, −V, ±0, ±0, ±0, ±0, ±0, ±0, ±0". The period at which a +V or −V appears is nine times the period of the transmission clock for serial data transmitted from the data transmission buffers 11 and 12 (the frequency is one ninth). Thus, the multiplication by nine of the frequency of signals produced upon detecting of +V or −V at the receiving end allows the sampling clock of the same frequency as the transmission clock for the serial data transmitted from the buffers 11 and 12 to be recovered from the received pseudo-ternary clock data.

Serial Data Receiving Device

The serial data receiving device, which is configured to receive and demodulate serial data modulated in the pseudo-ternary form, is equipped, as shown in FIG. 1, with two pairs of voltage comparators 17, 18; and 19, 20. The first pair of comparators 17 and 18 is connected with a differential signal line pair connected to the secondary winding of the transformer 15. The second pair of comparators 19 and 20 is connected with a differential signal line pair connected to the secondary winding of the transformer 16.

Each of the comparators 17 and 18 is formed of a differential input buffer and has a positive input terminal (+) and a negative input terminal (−). Each comparator outputs a signal at logic level "1" when the potential at its positive input terminal (+) is higher than that at its negative input terminal (−) and produces a signal having logic level "0" when the potential at the positive input terminal (+) is lower than that at the negative input terminal (−). One of the positive and negative input terminals is used as the signal input terminal to receive a signal to be detected, and the other is used as the reference signal input terminal to receive a reference signal for comparison.

The comparator 17, which is provided for detecting an +V output (positive pulse) that appears across the secondary winding of the transformer 15, has its positive input terminal (+) connected to the plus-side line of two signal lines (differential signal line pair) connected to the secondary winding of the transformer 15 and its negative input terminal (−) connected to the minus-side line. The comparator 17 makes a comparison between the potentials at the positive and negative terminals of the secondary winding of the transformer 15 and outputs a detected signal at logic level "1" indicating the detection of +V when the potential at the positive terminal is higher than that at the negative terminal. That is, the comparator 17 detects whether pseudo-ternary data that appears on the secondary side of the transformer 15 is +V or others (−V and ±0).

The comparator 18, which is provided for detecting a −V output that appears on the secondary side of the transformer 15, has its positive input terminal (+) connected to the minus-side line of the two signal lines connected to the secondary winding of the transformer 15 and its negative input terminal (−) connected to the plus-side line. The comparator 18 makes a comparison between the potentials at the positive and negative terminals of the secondary winding of the transformer 15 and outputs a detected signal at logic level "1" indicating the detection of −V when the potential at the negative terminal is higher than that at the positive terminal. That is, the comparator 18 detects whether pseudo-ternary data that appears on the secondary side of the transformer 15 is −V or others (+V and ±0).

Each of the comparators 19 and 20 connected with the secondary winding of the transformer 16 is also formed of a differential input buffer and has a positive input terminal (+) and a negative input terminal (−). Each comparator outputs a signal having logic level "1" when the potential at its positive input terminal (+) is higher than that at its negative input terminal (−) and produces a signal having logic level "0" when the potential at the positive input terminal (+) is lower than that at the negative input terminal (−). One of the positive and negative input terminals is used as the signal input terminal to receive a signal to be detected, and the other is used as the reference signal input terminal to receive a reference signal for comparison.

The comparator 19, which is provided for detecting a +V output from the transformer 16, has its positive input terminal (+) connected to the plus-side line of two signal lines (differential signal line pair) connected to the secondary winding of the transformer 16 and its negative input terminal (−) connected to the minus-side line. The comparator 19 makes a comparison between the potentials at the positive and negative terminals of the secondary winding of the transformer 16 and outputs a detected signal at logic level "1" indicating the detection of a +V when the potential at the positive terminal (+) is higher than that at the negative terminal (−). That is, the comparator 19 detects whether pseudo-ternary data that appears on the secondary side of the transformer 16 is +V or others (−V and ±0).

The comparator 20, which is provided for detecting an −V output from the transformer 16, has its positive input terminal (+) connected to the minus-side line of the two signal lines connected to the secondary winding of the transformer 16 and its negative input terminal (−) connected to the plus-side line. The comparator 20 makes a comparison between the potentials at the positive and negative terminals of the secondary winding of the transformer 16 and outputs a detected signal at logic level "1" indicating the detection of a −V when the potential at the negative terminal (−) is higher than that at the positive terminal (+). That is, the comparator 20 detects whether pseudo-ternary data that appears on the secondary side of the transformer 16 is −V or others (+V and ±0).

The clock recovery can be made by detecting only one of a +V and −V. For clock recovery, therefore, it is sufficient to use either one of the comparators 19 and 20. The present embodiment uses a scheme to recover the clock by detecting the period at which a +V appears from the repeating pattern of pseudo-ternary clock data; thus, only the comparator 19 is used and the comparator 20 is unnecessary.

In practice, as shown in FIG. 2, bias circuits 101, 102, 103, and 104 are connected to the inputs of the comparators 17, 18, 19 and 20, respectively. Further, equalizer circuits 105 and 106 are connected to the secondary windings of the transformers 15 and 16, respectively.

Each of the bias circuits 101 to 104 provides a reference voltage to a corresponding one of the comparators 17 to 20. These bias circuits serve to stabilize the operation of the comparators at the time of reception of ±0. In the bias circuit 101, resistors R1, R2 and R3 and a capacitor C produce a bias voltage which is applied as the reference voltage to the negative input terminal (−) of the comparator 17. Resistors R4 and R5 that are connected to the positive input terminal (+) of the comparator 17 constitutes a pulldown circuit. The bias circuit 101 keeps the potential at the negative input terminal (−) of the comparator 17 higher than that at the positive input terminal (+) at times other than the time of receiving a +V.

The other bias circuits 102, 103 and 104 are arranged identically to the bias circuit 101.

Owing to the provision of the bias circuits 101 to 104, the comparator 17 outputs a "1" only when a +V (a1>b1) is input and a "0" when a −V (a1<b1) or ±0 is input. The comparator 18 outputs a "1" only when a −V (a1<b1) is input and a "0" when a +V (a1>b1) or ±0 is input. The comparators 19 and 20 operate in the same way as the comparators 17 and 18, respectively.

Returning now back to FIG. 1, the description of the arrangement of the receiving device will be continued.

The comparator 17 is followed by D flip-flops (FF) 21 and 22 and an AND gate 26. Each D flip-flop functions as a sample and hold circuit. The D flip-flops 21,22 and the AND gate 26 constitute a detecting circuit that detects the positive-going transition (from "0" to "1") of the output of the comparator 17, that is, detects whether the comparator 17 has produced a signal at a "1" level corresponding to a +V. The detecting circuit samples and holds the output of the comparator 17 at regular intervals and compares two consecutive sample values, thereby detecting whether the output of the comparator 17 has made the transition from "0" to "1". Specifically, when the current sample value of the output of the comparator 17 held by the D flip-flop 21 is a "1" and the value of that sample held by the D flip-flop 22 which is one sample before the sample in the flip-flop 21 is a "0", the transition of the output of the comparator 17 from "0" to "1", i.e., a detected signal of a "1" corresponding to a +V having being produced from the comparator 17 is detected and a corresponding signal at logic "1" is output from the AND gate 26. The signal at logic "1" from the AND gate 26 indicates that the received data is +V, whereas a signal at logic "0" indicates that the received data is other than +V.

The comparator 18 is also followed by D flip-flops (FF) 23 and 24 and an AND gate 27. Each D flip-flop functions as a sample and hold circuit. The D flip-flops 23,24 and the AND gate 27 constitute a detecting circuit that detects the positive-going transition (from "0" to "1") of the output of the comparator 18, that is, detects whether the comparator 18 has produced a signal at a "1" level corresponding to −V. The detecting circuit samples and holds the output of the comparator 18 at regular intervals and compares two consecutive sample values, thereby detecting whether the output of the comparator 18 has made the transition from "0" to "1". Specifically, when the current sample value of the output of the comparator 18 held by the D flip-flop 23 is a "1" and the value of that sample held by the D flip-flop 24 which is one sample before the sample in the flip-flop 23 is a "0", the transition of the output of the comparator 18 from "0" to "1", i.e., a detected signal of a "1" corresponding to a −V having being produced from the comparator 18 is detected and a corresponding signal at logic "1" is output from the AND gate 27. The signal at logic "1" from the AND gate 27 indicates that the received data is a −V, whereas a signal at logic "0" indicates that the received data is other than a −V.

As described previously, in the pseudo-ternary transfer scheme, binary data "1" is converted into a +V or a −V and binary data "0" is converted into ±0. Thus, ORing the output signals of the AND gates 26 and 27 by an OR gate 28 allows binary data corresponding to the transmitted pseudo-ternary data to be recovered.

A clock generator 25 multiplies the frequency of the +V detected signal output from the comparator 19 by nine to produce a sampling clock CLK of the same frequency as the transmit clock for the serial data stream. The sampling clock CLK is applied to the clock input of each of the D flip-flops 21 to 24.

Operation of Transmitting/Receiving Pseudo-Ternary Data

Figure 3:
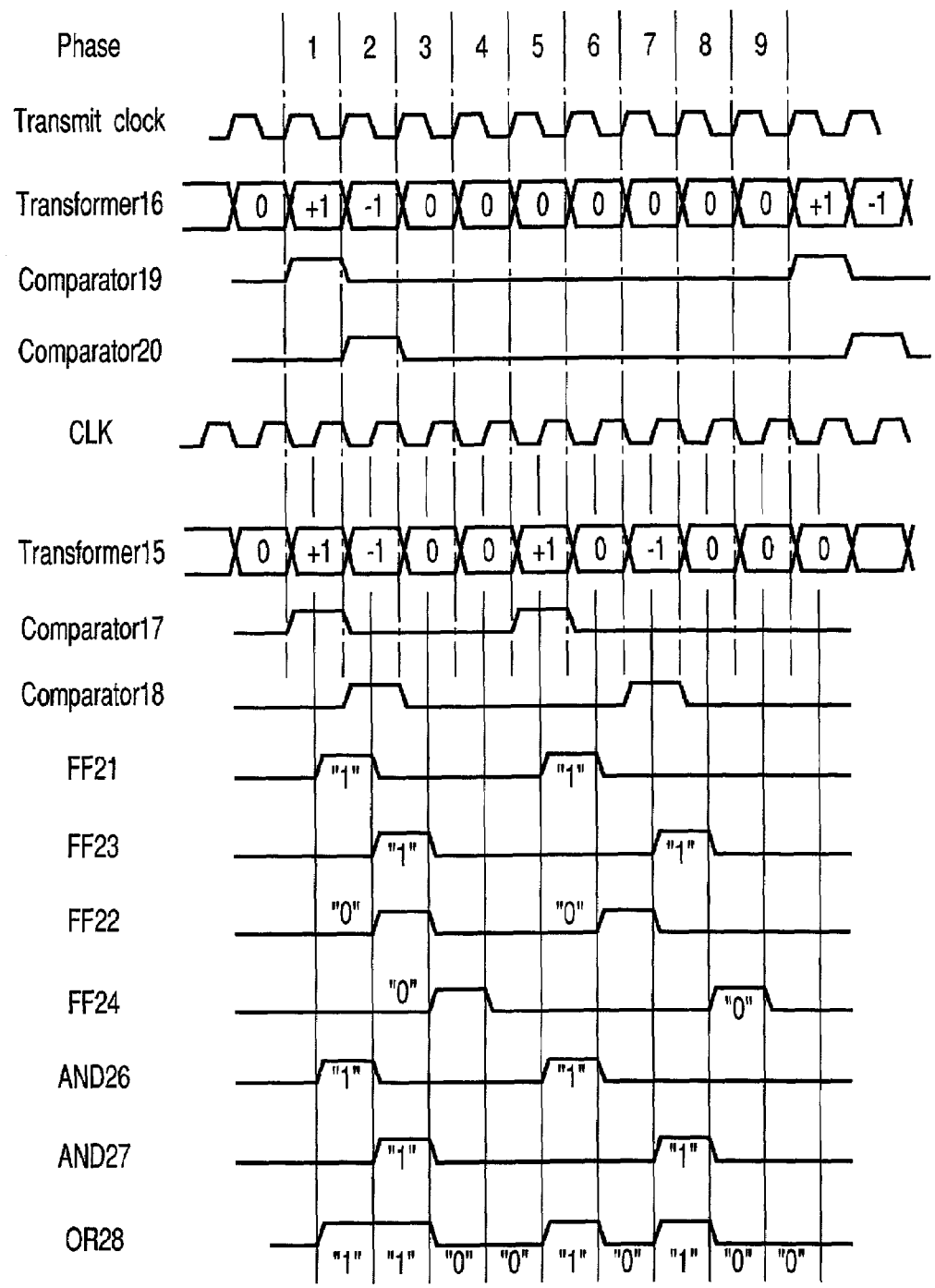
FIG. 3 is a timing diagram explanatory of the data receiving and recovering operation of the device of FIG. 1.

Next, reference is made to a timing diagram of FIG. 3 to describe the operation of transmitting/receiving pseudo-ternary data. In the description which follows, unless otherwise stated, +V, −V and ±0 in pseudo-ternary data are represented by +1, −1, and 0, respectively. The timing diagram of FIG. 3 supposes the case where the following conditions (a) to (d) are established:

(a) Serial data modulated in the pseudo-ternary form is transmitted one bit at a time with each rising edge of the transmit clock shown in FIG. 3.

(b) During the interval from phase 1 to phase 9 in FIG. 3, pseudo-ternary serial data "+1, −1, 0, 0, +1, 0, −1, 0, 0"

corresponding to binary serial data "1, 1, 0, 0, 1, 0, 1, 0, 0" is transmitted over the data transmission differential signal line pair in synchronism with the transmit clock and then appears across the secondary winding of the transformer 15.

(c) During the interval from phase 1 to phase 9 in FIG. 3, pseudo-ternary serial data "+1, −1, 0, 0, 0, 0, 0, 0, 0" corresponding to binary serial data "1, 1, 0, 0, 0, 0, 0, 0, 0" is sent over the clock transmission differential signal line pair in synchronism with the transmit clock and then appears on the secondary side of the transformer 16.

(d) The sampling clock CLK shown in FIG. 3 is output from the clock generator 25 of FIG. 1.

When data "+1" is transmitted over the transformer 15, a detected signal at logic level "1" indicating the reception of "+1" is output from the comparator 17. The output signal of the comparator 17 is sampled and held by the D flip-flop 21 at the time of occurrence of a rising edge of the sampling clock CLK, an output signal of the D flip-flop 21 is sampled and held by the succeeding D flip-flop 22 at the occurrence of the next rising edge of the sampling clock CLK. That is, the D flip-flop 21 holds the current sample value of the output signal of the comparator 17, whereas the D flip-flop 22 holds the sample value of one sampling clock pulse before.

The output of the flip-flop 21 is applied to the first input of the AND gate 26 and the output logical level of the flip-flop 22 is inverted and applied to the second input of the AND gate 26. Thus, when the output of flip-flop 22 is at logic "0" and the output of the flip-flop 21 is at logic "1", the output of the AND gate 26 goes to logic "1", indicating the reception of "+1" by the comparator 17. That is, the output signal of the AND gate 26 corresponds to demodulated binary data "1" for the pseudo-ternary data "+1".

When data "−1" is transmitted over the transformer 15, a detected signal at logic level "1" indicating the reception of "−1" is output from the comparator 18. The output signal of the comparator 18 is sampled and held by the D flip-flop 23 at the time of occurrence of a rising edge of the sampling clock CLK, an output signal of the D flip-flop 23 is sampled and held by the succeeding D flip-flop 24 at the occurrence of the next rising edge of the sampling clock CLK. That is, the D flip-flop 23 holds the current sample value of the output signal of the comparator 18, whereas the D flip-flop 24 holds the sample value of one sampling clock pulse before.

The output of the flip-flop 23 is applied to the first input of the AND gate 27, and the output logical level of the flip-flop 24 is inverted and applied to the second input of the AND gate 27. Thus, when the output of flip-flop 24 is at logic "0" and the output of the flip-flop 23 is at logic "1", the output of the AND gate 27 goes to logic "1", indicating the reception of "−1" by the comparator 18. That is, the output signal of the AND gate 27 corresponds to demodulated binary data "1" for the pseudo-ternary data "−1".

Thus, by ORing the outputs of the AND gates 26 and 27 through the OR gate 28, binary data that assumes two values of "1" and "0" is recovered from the pseudo-ternary data that assumes three values of "+1", "−1", and "±0". Consequently, as shown in the bottom portion of FIG. 3, binary serial data "1, 1, 0, 0, 1, 0, 1, 0, 0" is obtained through the OR gate 28.

Thus, in the data receiving device according to the first embodiment of the present invention, the first state, +V, in which current flows in the positive direction in the transformer 15 is detected by the comparator 17, and the second state, −V, in which current flows in the negative direction in the transformer 15 is detected by the comparator 18. In principle, the outputs of the respective comparators 17 and 18 can be used as demodulated (recovered) data as they are. However, this increases the possibility of errors such that "±0" transmitted subsequent to "+V" is mistaken for "+V", and "±0" transmitted subsequent to "−V" is mistaken for "−V". This is because, due to rounding of the output waveform of each of the comparators 17 and 18, it may seem as if each comparator is outputting a detected signal corresponding to +V or −V continuously during two sampling intervals. In this embodiment, as opposed to using the outputs of the comparators 17 and 18 as demodulated data as they are, each of the comparators 17, 18 is followed by the circuit that samples the output of the corresponding comparator and detects the transition of the sample value in a particular direction. Thereby, even if a detected signal corresponding to "+V" or "−V" is output from the comparator 17 or 18 continuously during the two sampling intervals, it is regarded as a detected signal for one piece of data "+V" or "−V". Thus, the detection of the transition of the output of each comparator in a certain direction allows the robustness (resilience) to errors in data recovery to be increased and faster transmission of data in pseudo-ternary form to be achieved.

Hereinafter, reference is made to FIG. 4 to describe the reason why the robustness to errors in data recovery is improved.

Operation of Demodulating (Recovering) Data

Figure 4:
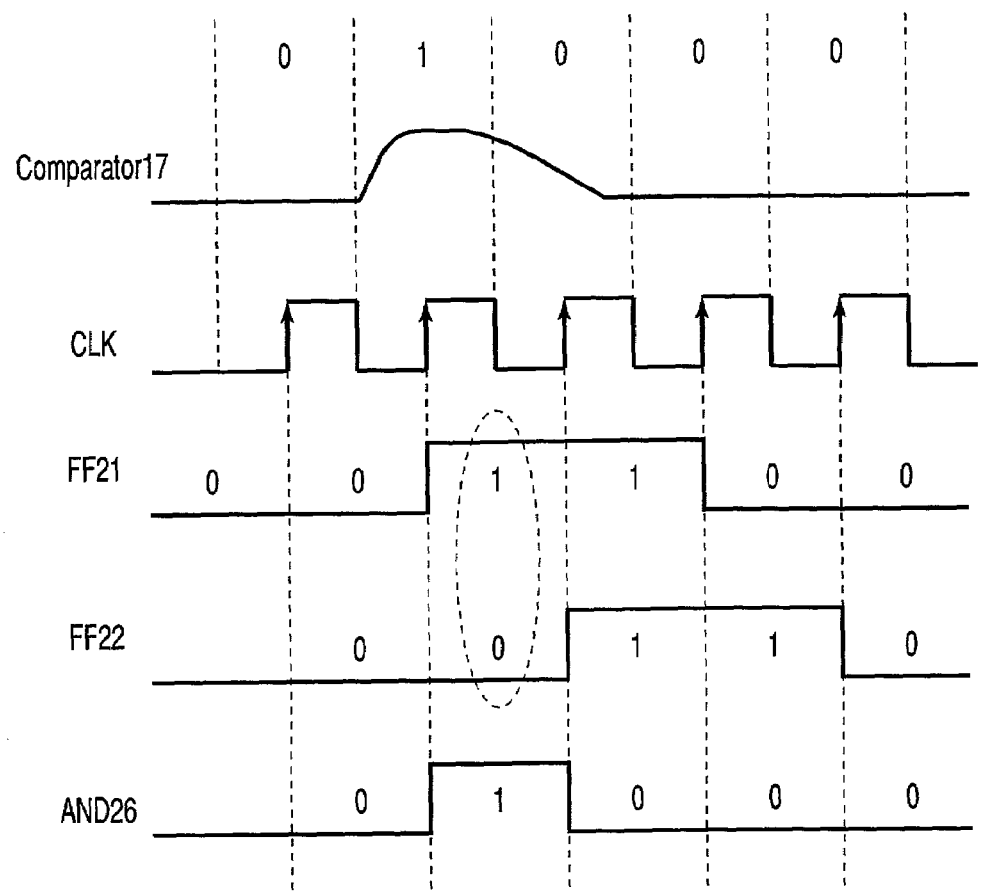
FIG. 4 is a diagram for use in explanation of the effect of data recovery operation of the device of FIG. 1.

FIG. 4 shows an operation of recovering data at the time of transmitting binary serial data "0, 1, 0, 0, 0" with modulation in pseudo-ternary form.

In the pseudo-ternary data transmission, as described previously, the transmission of binary data of a "1" involves active driving of the differential signal line pair with a +V or −V and the transmission of a "0" involves passive driving of the differential signal line pair (no current flows in the line pair). For this reason, the change of the level of input voltage to the voltage comparator 17 for detecting received data of "+1" when the received data changes from "+1" to "±0" becomes slower than when the received data changes from "±0" to "+1". Likewise, the change of the level of input voltage to the voltage comparator 18 for detecting received data of "−1" when the received data changes from "−1" to "±0" becomes slower than when the received data changes from "±0" to "1".

Such a voltage level change, when viewed from the output of the comparators 17 and 18, appears as a waveform such that the trailing edge of a signal at logic 1 has become stretched. If the stretched trailing edge of the output of the comparator 17 was picked up at the next sampling clock pulse, the output of the D flip-flop 21 would, as shown in FIG. 4, become "0, 1, 1, 0, 0" as opposed to the original bit stream "0, 1, 0, 0, 0". Therefore, the use of the output of the D flip-flop 21 as demodulated data as it is, would result in errors in demodulated data.

However, this embodiment is configured in such a way as to make a comparison between the output of the D flip-flop 21 ("0, 1, 1, 0, 0") and the output of the D flip-flop 22 ("0, 0, 1, 1, 0") and to detect the pseudo-ternary data "+1" on the condition that the output of the flip-flop 22 is a "0" and the output of the flip-flop 21 is a "1". The stretched trailing edge of an output signal of the voltage comparator 17 can be prevented from being detected in error as pseudo-ternary data "+1". Thus, by detecting the transition in a particular direction of the output of the voltage comparator (in this example, the transition from "0" to "1"), the resilience to errors in data recovery can be improved and faster transmission of pseudo-ternary data can be achieved.

For the output signal of the voltage comparator 18 adapted to detect pseudo-ternary data "−1" as well, the D flip-flops 23 and 24 provide the same effect as with the voltage comparator 17.

Second Example of Data Receiving Device

Figure 5:
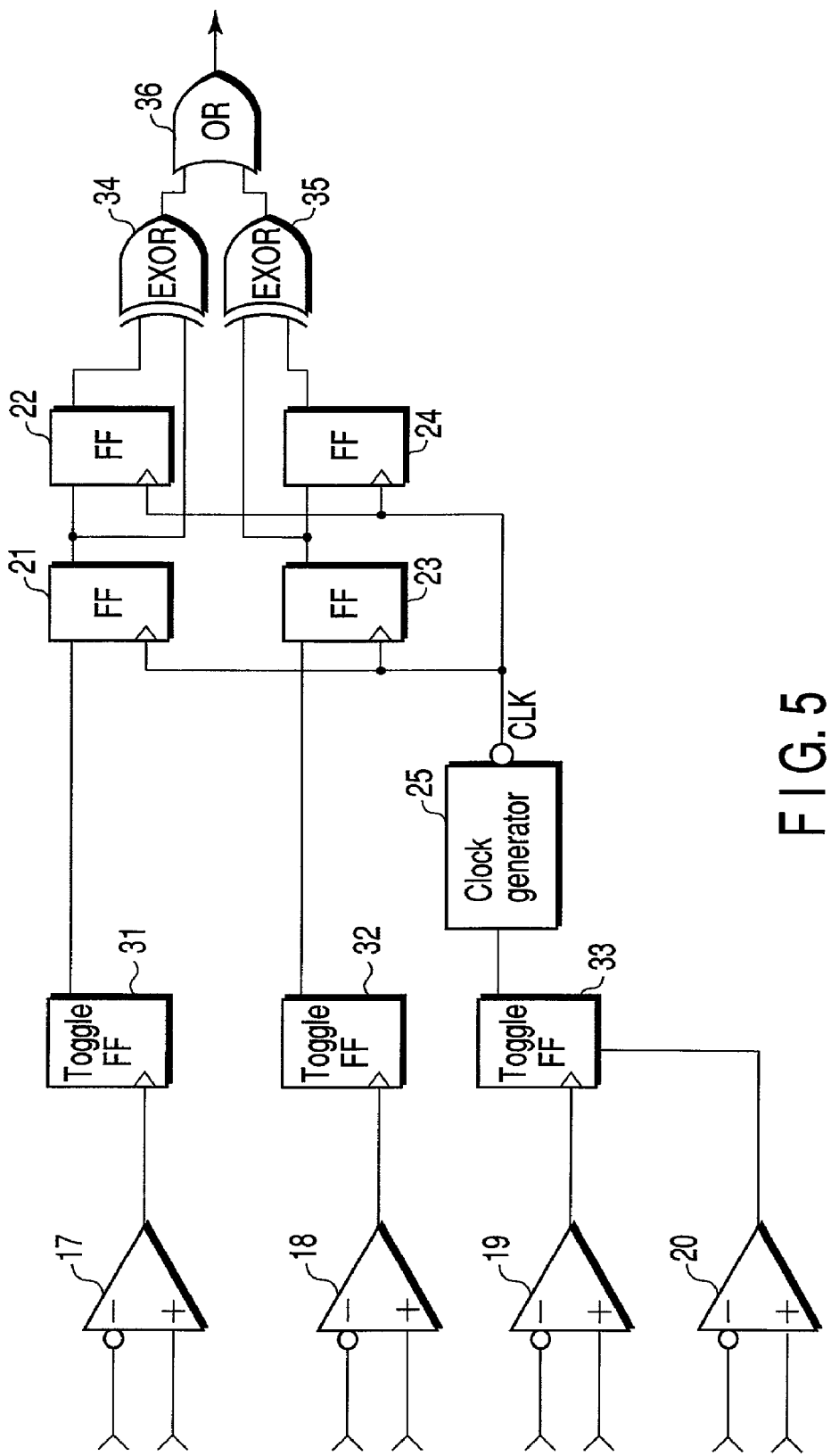
FIG. 5 shows a modification of the data receiving device of FIG. 1.

Referring now to FIG. 5, there is shown a second example of a data receiving device. In this figure, corresponding components to those in FIG. 1 are denoted by like reference numerals. In this device, toggle flip-flops 31 and 32 are connected between the comparator 17 and the D flip-flop 21 and between the comparator 18 and the D flip-flop 23, respectively. Further, an Exclusive-OR (EXOR) gate 34 is provided in place of the AND gate 26 of FIG. 1 to compare the outputs of the flip-flops 21 and 22. Likewise, an Exclusive-OR gate 35 is provided in place of the AND gate 27.

Figure 7:
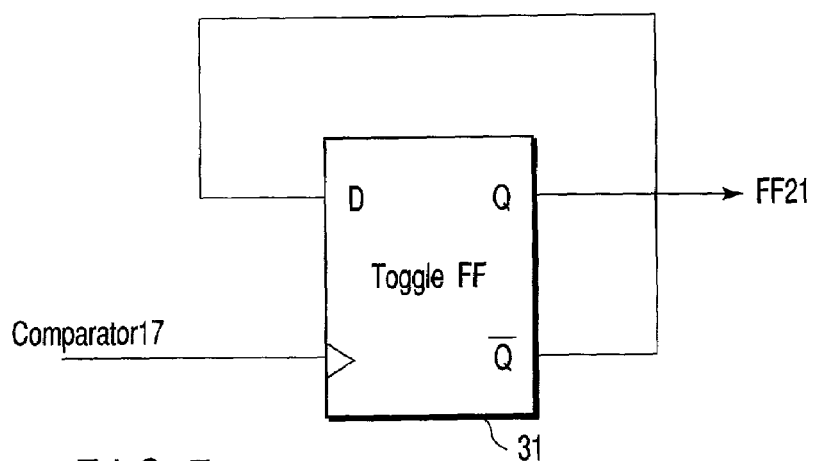
FIG. 7 shows a specific example of the toggle flip-flop used in the data receiver of FIG. 5.

The toggle flip-flop 31 is a bistable toggle output circuit that is triggered by the leading edge (the rising edge in this example) of a detected signal for logic "1" from the comparator 17. When the toggle flip-flop 31 is triggered, the output signal of the toggle flip-flop 31 is changed from "1" to "0" and vice versa. The toggle flip-flop 31 can be formed, as shown in FIG. 7, of a D flip-flop which has its clock input connected to the output of the comparator 17 and its inverted output (Q⁻) fed back to its data input D. The logic level at the non-inverted output Q of the toggle flip-flop 31 goes from one of logic levels "1" and "0" to the other at each of the rising edges of detected signals for logic "1" from the comparator 17. The potential at the non-inverted output Q retains the current value until the next rising edge is input. The default potential at the non-inverted output Q is at logic "0".

The toggle flip-flip 32 is a bistable toggle output circuit that is triggered by the leading edge (the rising edge in this example) of a detected signal for logic "1" from the comparator 18. When the toggle flip-flop 32 is triggered, the output signal of the toggle flip-flop 32 is changed from "1" to "0" and vice versa. Like the toggle flip-flop 31, the toggle flip-flop 32 can also be formed of a D flip-flop which has its clock input connected to the output of the comparator 18 and its inverted output (Q⁻) fed back to its data input D.

Further, a toggle flip-flop 33 is connected between the comparator 19 and the clock generator 25, which is a bistable toggle output circuit that is triggered by the leading edge (the rising edge) of a detected signal for logic 1 from the comparator 19 to make a transition from "1" to "0" and vice versa. Like the toggle flip-flop 31, the toggle flip-flop 33 can also be formed of a D flip-flop which has its clock input connected to the output of the comparator 19 and its inverted output (Q⁻) fed back to its data input D. The potential at the non-inverted output Q is reset to the default potential at logic "0" at each of the rising edges of detected signals for logic "1" from the comparator 20.

These toggle flip-flops 31 to 33 allow the normal transfer of detected signals for logic "1" from the corresponding comparators 17 to 19 to their respective succeeding circuits, irrespective of the duration and timing of those detected signals.

That is, the output logic levels of the comparators 17 to 19 are not inverted from "0" to "1" unless the reference potentials set by the bias circuits 101 to 103 are reached by their respective input signal potentials. For example, in the comparator 17, its output logic level is not changed from "0" to "1", unless the potential at the signal input terminal of the comparator 17 is becomes more than the reference potential at its reference signal input terminal by a threshold voltage of the comparator 17. For this reason, the interval during which the comparator output is kept at logic level "1" becomes very short, namely, the pulse width of detected signal for logic "1" becomes very narrow, making it difficult to meet the set-up/hold time requirements of the flip-flops 21 and 23 that take in those signals. When not met, the detected signals for logic "1" from the comparator 17, 18 are not transferred normally to the flip-flops 21 and 23, resulting in loss of those signals. In this case, the pseudo-ternary data "+V" or "−V" corresponding to binary data "1" cannot be detected correctly, with the result that a binary data "1" is erroneously detected as a "0".

In the configuration of FIG. 5, the toggle flip-flops 31 to 33 allow the detected signals for logic "1" from the corresponding comparators 17 to 19 to be transferred normally to their respective succeeding circuits; thus, the above problems can be solved.

Operation of Data Receiving Device of FIG. 5

Figure 6:
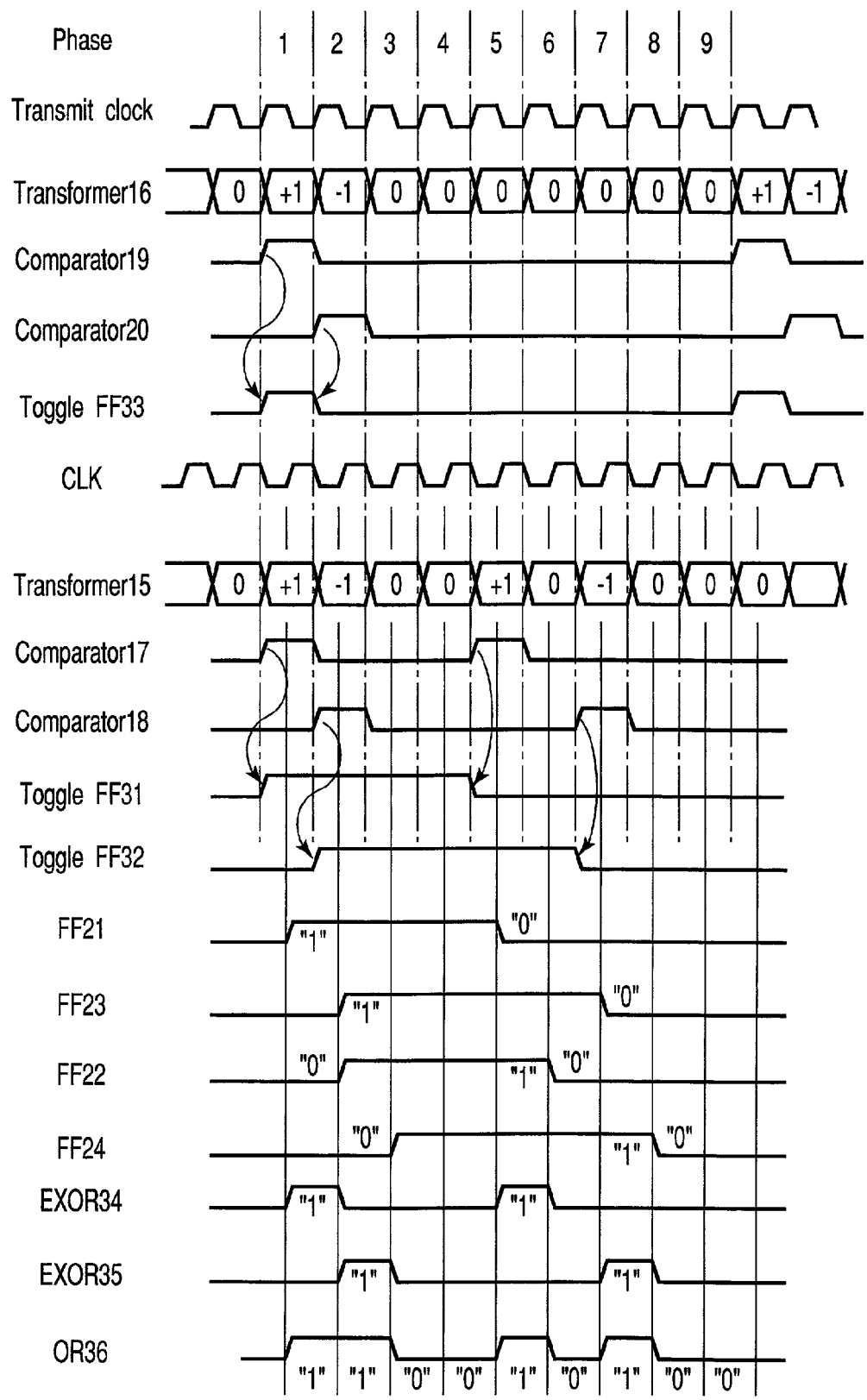
FIG. 6 is a timing diagram explanatory of the data receiving and recovering operation of the device of FIG. 5.

Next, reference is made to a timing diagram of FIG. 6 to describe the operation of the data receiving device of FIG. 5. It is here assumed that the following conditions (a) to (d) are satisfied:

(a) Serial data modulated in the pseudo-ternary form is transmitted one bit at a time with each rising edge of the transmit clock shown in FIG. 6.

(b) During the interval from phase 1 to phase 9 in FIG. 6, pseudo-ternary serial data "+1, −1, 0, 0, +1, 0, −1, 0, 0" corresponding to binary serial data "1, 1, 0, 0, 1, 0, 1, 0, 0" is transmitted over the data transmission differential signal line pair in synchronism with the transmit clock and then appears on the secondary side of the transformer 15.

(c) During the interval from phase 1 to phase 9 in FIG. 6, pseudo-ternary serial data stream "+1, −1, 0, 0, 0, 0, 0, 0, 0" corresponding to binary serial data stream "1, 1, 0, 0, 0, 0, 0, 0, 0" is sent over the clock transmission differential signal line pair in synchronism with the transmit clock and then appears on the secondary side of the transformer 16.

(d) The sampling clock CLK shown in FIG. 6 is produced from the clock generator 25 of FIG. 5 in response to the output of the toggle flip-flop 33 (which goes to logic "1" when the output of the comparator 19 goes from logic "0" to logic "1" and then goes to logic "0" (reset state) when the output of the comparator 20 goes from logic "0" to logic "1").

When ternary data "+1" is transferred via the transformer 15, the comparator 17 outputs a signal at logic level 1 indicating the reception of data "+1". When the comparator 17 makes a positive-going transition (the output of the comparator 17 goes from logic level "0" to logic level "1"), the output of the toggle flip-flop 31 goes from logic level "0" to logic level "1". The flip-flop 31 remains in the "1" state until the occurrence of the next positive-going transition of the output of the comparator 17. The output at logic "1" of the toggle flip-flop 31 is sampled and held by the D flip-flop 21 at the occurrence of a positive-going transition of the sampling clock CLK. The resulting output at logic "1" of the D flip-flop 21 is sampled and held by the succeeding D flip-flop 22 at the next positive-going transition of the sampling clock CLK. That is, the D flip-flop 21 stores the value of the current output signal of the toggle flip-flop 31 and the D flip-flop 22 stores the value of the output signal of one sampling clock pulse before.

After that, when ternary data "+1" is transferred via the transformer 15 again, the comparator 17 outputs a signal at logic level "1" indicating the reception of data at "+1". When the comparator 17 makes a positive-going transition, the output of the toggle flip-flop 31 goes from logic level "1" to logic level "0". The flip-flop 31 remains in the "0" state until the occurrence of the next positive-going transition of the output of the comparator 17. The output at logic "0" of the toggle flip-flop 31 is sampled and held by the D flip-flop 21 at the occurrence of a positive-going transition of the sampling clock CLK. The resulting output at logic "0" of the D flip-flop 21 is sampled and held by the succeeding D flip-flop 22 at the next positive-going transition of the sampling clock CLK. That is, the D flip-flop 21 stores the value of the current output signal of the toggle flip-flop 31 and the D flip-flop 22 stores the value of the output signal of one sampling clock pulse before.

The outputs of the D flip-flops 21 and 22 are input to first and second inputs of the EXOR gate 34, respectively. The EXOR gate 34 produces an output signal at logic "1" when the outputs of the D flip-flops 21 and 22 are at logic levels "0" and "1", respectively, and vice versa. The output at logic "1" of the EXOR gate 34 indicates that the output of the toggle flip-flop 31 has changed from logic "0" to logic "1" or from logic "1" to logic "0", in other words, received ternary data "+1" has been detected by the comparator 17. That is, the output signal of the EXOR gate 34 is recovered binary data "1" corresponding to pseudo-ternary data "+1".

When ternary data "−1" is transferred via the transformer 15, the comparator 18 outputs a signal at logic level "1" indicating the reception of data "−1". When the comparator 18 makes a positive-going transition (the output of the comparator 18 goes from logic level "0" to logic level "1"), the output of the toggle flip-flop 32 goes from logic level "0" to logic level "1". The flip-flop 32 remains in the "1" state until the occurrence of the next positive-going transition of the output of the comparator 18. The output at logic "1" of the toggle flip-flop 32 is sampled and held by the D flip-flop 23 at the occurrence of a positive-going transition of the sampling clock CLK. The resulting output at logic "1" of the D flip-flop 23 is sampled and held by the succeeding D flip-flop 24 at the next positive-going transition of the sampling clock CLK. That is, the D flip-flop 23 stores the value of the current output signal of the toggle flip-flop 32 and the D flip-flop 24 stores the value of the output signal of one sampling clock pulse before.

After that, when ternary data "−1" is transferred via the transformer 15 again, the comparator 18 outputs a signal at logic level "1" indicating the reception of data "−1". When the comparator 18 makes a positive-going transition, the output of the toggle flip-flop 32 goes from logic level "1" to logic level "0". The flip-flop 32 remains in the "0" state until the occurrence of the next positive-going transition of the output of the comparator 18. The output at logic "0" of the toggle flip-flop 32 is sampled and held by the D flip-flop 23 at the occurrence of a positive-going transition of the sampling clock CLK. The resulting output at logic "0" of the D flip-flop 23 is sampled and held by the succeeding D flip-flop 24 at the next positive-going transition of the sampling clock CLK. That is, the D flip-flop 23 stores the value of the current output signal of the toggle flip-flop 32 and the D flip-flop 24 stores the value of the output signal of one sampling clock pulse before.

The outputs of the D flip-flops 23 and 24 are input to first and second inputs of the EXOR gate 35, respectively. The output of the EXOR gate 35 goes to logic "1" when the outputs of the D flip-flops 24 and 23 are at logic levels "0" and "1", respectively, and vice versa. The output at logic "1" of the EXOR gate 35 indicates that the output of the toggle flip-flop 32 has changed from logic "0" to logic "1" or from logic "1" to logic "0", in other words, received ternary data "−1" has been detected by the comparator 18. That is, the output signal of the EXOR gate 35 is recovered binary data of "1" corresponding to pseudo-ternary data "−1".

By ORing the outputs of the EXOR gates 34 and 35 through the OR gate 36, binary data is recovered from pseudo-ternary data. As shown, binary serial data "1, 1, 0, 0, 1, 0, 1, 0, 0" is obtained through the OR gate 36.

As described above, the toggle flip-flops 31 and 32, whose outputs alternate between "1" and "0" by being triggered by positive-going transitions of the outputs of the comparators 17 and 18, are provided to precede the D flip-flops 21 and 23, thus allowing the set-up and hold time requirements of the D flip-flops to be satisfied sufficiently. It therefore becomes possible to eliminate errors in data recovery due to the waveform rounding (stretching of the trailing edge) and short duration of outputs at logic "1" of the comparators 17 and 18.

The waveform rounding of the outputs of the comparators 17 and 18 is liable to occur when the reference voltage of the comparators is set low by the bias circuits 101 and 102. Conversely, setting the reference voltage high tends to cause the problem that the duration of comparator outputs at logic "1" becomes short. Therefore, the configuration of FIG. 5 allows binary data to be recovered from pseudo-ternary data with precision without depending on the setting of the reference potential.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A data receiving apparatus for receiving and demodulating data modulated in a pseudo-ternary form which is transferred over signal line pair in which a transformer is inserted, the data modulated in the pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising:

a first comparator configured to make a comparison between potentials on the paired signal lines connected with the secondary winding of the transformer to produce a signal indicating whether data of the first value has been received or not;

a second comparator configured to make a comparison between potentials on the paired signal lines connected with the secondary winding of the transformer to output a signal indicating whether data of the second value has been received or not;

a first detector configured to sample the output signal of the first comparator at regular sampling intervals and to compare the value of the current sample with the value of a sample of one sampling interval before to produce a signal indicating whether an output signal indicating the reception of data of the first value has been produced from the first comparator;

a second detector configured to sample the output signal of the second comparator at the regular sampling intervals and to compare the value of the current sample with the value of a sample of one sampling interval before to produce a signal indicating whether an output signal indicating the reception of data of the second value has been produced from the second comparator; and an output circuit connected to receive the output signals of the first and second detectors, configured to produce demodulated data corresponding to the data modulated in the pseudo-ternary form.

2. The data receiving apparatus according to claim 1, wherein the first comparator has its positive and negative inputs connected to the positive- and negative-side signal lines, respectively, of the signal line pair connected to the secondary winding of the transformer, and the second comparator has its positive and negative inputs connected to the negative- and positive-side signal lines, respectively.

3. The data receiving apparatus according to claim 1, wherein the first detector includes a first sample-and-hold circuit which has its input connected to the output of the first comparator and is driven by sampling clock pulses the period of which corresponds to the sampling interval, a second sample-and-hold circuit which has its input connected to the output of the first sample-and-hold circuit and is driven by the sampling clock pulses, and a logic gate circuit connected to receive the output signals of the first and second sample-and-hold circuits, configured to output a signal indicating whether an output signal indicating the reception of data of the first value has been produced from the first comparator.

4. The data receiving apparatus according to claim 3, wherein the second detector includes a third sample-and-hold circuit which has its input connected to the output of the second comparator and is driven by the sampling clock pulses, a fourth sample-and-hold circuit which has its input connected to the output of the third sample-and-hold circuit and is driven by the sampling clock pulses, and a logic gate circuit connected to receive the output signals of the third and fourth sample-and-hold circuits, configured to output a signal indicating whether an output signal indicating the reception of data of the second value has been produced from the second comparator.

5. The data receiving apparatus according to claim 1, further comprising a clock data receiving circuit connected to receive clock data modulated in the pseudo-ternary form and transferred over clock signal line pairs in which a transformer is inserted, the clock data receiving circuit having a clock generator responsive the received clock data, configured to produce clock pulses that defines the sampling interval.

6. The data receiving apparatus according to claim 1, further comprising:
a first toggle circuit, connected between the first comparator and the first detector, configured to be triggered by the first comparator each time the first comparator produces a signal indicating the reception of data of the first value, and to change the output state from one of logic levels 0 and 1 to the other; and
a second toggle circuit, connected between the second comparator and the second detector, configured to be triggered by the second comparator each time the second comparator produces a signal indicating the reception of data of the second value, and to change the output state from one of logic levels 0 and 1 to the other.

7. The data receiving apparatus according to claim 2, further comprising a first bias circuit configured to supply a reference potential to the negative input terminal of the first comparator, and a second bias circuit configured to supply a reference potential to the negative input terminal of the second comparator.

8. A data receiving apparatus for receiving and demodulating data modulated in a pseudo-ternary form which is transferred over signal line pair in which a transformer is inserted, the data modulated in the pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising:
a first comparator configured to make a comparison between potentials on the paired signal lines connected with the secondary winding of the transformer to produce a signal indicating whether data of the first value has been received or not;
a second comparator configured to make a comparison between potentials on the paired signal lines connected with the secondary winding of the transformer to output a signal indicating whether data of the second value has been received or not;
a first toggle circuit, connected to the first comparator, configured to be triggered each time the first comparator produces a signal indicating the reception of data of the first value, and to change its output state from one of logic levels 0 and 1 to the other;
a second toggle circuit, connected to the second comparator, configured to be triggered each time the second comparator produces a signal indicating the reception of data of the second value, and to change the output state from one of logic levels 0 and 1 to the other;
a first detector configured to sample the output signal of the first toggle circuit at regular sampling intervals and to compare the value of the current sample with the value of a sample of one sampling interval before to produce a signal indicating whether an output signal indicating the reception of data of the first value has been produced from the first comparator;
a second detector configured to sample the output signal of the second toggle circuit at the regular sampling intervals and to compare the value of the current sample with the value of a sample of one sampling interval before to produce a signal indicating whether an output signal indicating the reception of data of the second value has been produced from the second comparator; and
an output circuit connected to receive the output signals of the first and second detectors, configured to produce demodulated data corresponding to the data modulated in the pseudo-ternary form.

9. A data transfer system for transferring data modulated in a pseudo-ternary form over signal line pair in which a transformer is inserted, the data modulated in the pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising:
a first electronic equipment transferring the data modulated in pseudo-ternary over the signal line pairs; and
a second electronic equipment receiving and demodulating the data modulated in the pseudo-ternary form transferred over the signal line pair,
the second electronic equipment comprising:
a first comparator configured to make a comparison between potentials on the paired signal lines connected with the secondary winding of the transformer to produce a signal indicating whether data of the first value has been received or not;

a second comparator configured to make a comparison between potentials on the paired signal lines connected with the secondary winding of the transformer to output a signal indicating whether data of the second value has been received or not;

a first detector configured to sample the output signal of the first comparator at regular sampling intervals and to compare the value of the current sample with the value of a sample of one sampling interval before to produce a signal indicating whether an output signal indicating the reception of data of the first value has been produced from the first comparator;

a second detector configured to sample the output signal of the second comparator at the regular sampling intervals and to compare the value of the current sample with the value of a sample of one sampling interval before to produce a signal indicating whether an output signal indicating the reception of data of the second value has been produced from the second comparator; and an output circuit connected to receive the output signals of the first and second detectors, configured to produce demodulated data corresponding to the data modulated in the pseudo-ternary form.

10. A data receiving device for receiving data modulated in a pseudo-ternary form which is transferred over signal line pair in which a transformer is inserted, the data modulated in the pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising:

a first data receiver which makes a comparison between potentials on the paired signal lines connected with the secondary winding of the transformer to produce a signal indicating whether data of the first value has been received or not, then samples the signal at regular sampling intervals and produces a signal indicating the presence or absence of the reception of data of the first value on the basis of the value of the current sample and the value of a sample of one sampling interval before;

a second data receiver which makes a comparison between potentials on the paired signal lines connected with the secondary winding of the transformer to produce a signal indicating whether data of the second value has been received or not, then samples the signal at regular sampling intervals and produces a signal indicating the presence or absence of the reception of data of the second value on the basis of the value of the current sample and the value of a sample of one sampling interval before; and an output circuit connected to receive the output signals of the first and second receivers, configured to produce demodulated data corresponding to the data modulated in the pseudo-ternary form.

11. A data receiving method for receiving data modulated in a pseudo-ternary form which is transferred over signal line pair in which a transformer is inserted, the data modulated in the pseudo-ternary form taking either of the three values: a first value by which current is allowed to flow in a positive direction in the transformer; a second value by which current is allowed to flow in a negative direction in the transformer; and a third value by which no current is allowed to flow in the transformer, comprising:

making a comparison between potentials on the paired signal lines connected with the secondary winding of the transformer to produce a signal indicating whether data of the first value has been received or not, then sampling the signal at regular sampling intervals and producing a first detecting signal indicating the presence or absence of the reception of data of the first value on the basis of the value of the current sample and the value of a sample of one sampling interval before;

making a comparison between potentials on the paired signal lines connected with the secondary winding of the transformer to produce a signal indicating whether data of the second value has been received or not, then sampling the signal at regular sampling intervals and producing a second detecting signal indicating the presence or absence of the reception of data of the second value on the basis of the value of the current sample and the value of a sample of one sampling interval before; and producing demodulated data corresponding to the data modulated in the pseudo-ternary form, in accordance with the first and second detecting signals.

* * * * *